(12) United States Patent
Mott

(10) Patent No.: US 8,328,006 B2
(45) Date of Patent: Dec. 11, 2012

(54) CONVEYOR ROLLER SERVICING APPARATUS

(75) Inventor: George T. Mott, Alburtis, PA (US)

(73) Assignee: Asgco Manufacturing, Inc., Allentown, PA (US)

( * ) Notice: Subject to any disclaimer, the term of this patent is extended or adjusted under 35 U.S.C. 154(b) by 268 days.

(21) Appl. No.: 12/793,933

(22) Filed: Jun. 4, 2010

(65) Prior Publication Data
US 2011/0297511 A1    Dec. 8, 2011

(51) Int. Cl.
*B65G 15/60*    (2006.01)
(52) U.S. Cl. .................. 198/861.1; 198/842; 198/860.1; 198/866
(58) Field of Classification Search .............. 198/810.03, 198/842, 860.1, 861.1, 866
See application file for complete search history.

(56) References Cited

U.S. PATENT DOCUMENTS

| | | | |
|---|---|---|---|
| 809,227 A | | 1/1906 | Steckel |
| 1,276,724 A | * | 8/1918 | Cowley .......................... 198/842 |
| 2,693,269 A | * | 11/1954 | Bentley ........................... 198/842 |
| 3,877,568 A | * | 4/1975 | Breiling et al. ................. 198/842 |
| 4,513,859 A | * | 4/1985 | Long et al. ...................... 198/842 |
| 5,027,940 A | | 7/1991 | Woodward |
| 5,056,655 A | | 10/1991 | Justice |
| 5,109,937 A | * | 5/1992 | Kipp .............................. 177/145 |
| 5,117,970 A | | 6/1992 | Gibbs |
| 5,590,757 A | * | 1/1997 | Walter et al. ................... 198/812 |
| 5,645,158 A | * | 7/1997 | Polka et al. .................... 198/812 |
| 5,680,925 A | * | 10/1997 | Gallagher et al. ......... 198/861.1 |
| 5,988,360 A | | 11/1999 | Mott |
| 6,095,320 A | * | 8/2000 | DeMong et al. .............. 198/812 |
| 6,237,753 B1 | * | 5/2001 | Walter et al. ................... 198/824 |
| 6,269,943 B1 | | 8/2001 | Mott |
| 6,273,241 B1 | * | 8/2001 | Bonnet ........................... 198/790 |
| 6,427,828 B1 | * | 8/2002 | East et al. ....................... 198/826 |
| 6,948,609 B2 | | 9/2005 | Finger et al. |
| 7,083,040 B2 | | 8/2006 | Finger et al. |
| 7,762,387 B2 | * | 7/2010 | Dunn ............................. 198/823 |
| 7,950,520 B2 | * | 5/2011 | Mott ............................... 198/826 |

FOREIGN PATENT DOCUMENTS

| | | |
|---|---|---|
| JP | 06-056023 U | 8/1994 |
| JP | 08-067320 A | 3/1996 |
| JP | 09-278150 A | 10/1997 |

(Continued)

OTHER PUBLICATIONS

ASGCO Mfg., Inc., "Slide-lers, Conveyor Belt Idlers", prior to Jun. 4, 2010, 3 pages.

(Continued)

*Primary Examiner* — Douglas Hess
(74) *Attorney, Agent, or Firm* — Ceasar, Revise, Bernstein, Cohen & Pokotilow, Ltd.

(57) ABSTRACT

A return side conveyor belt support for a conveyor may comprise: a mandrel mountable to the far side of the conveyor and extending transversely toward the near side thereof; a member slidably and rotatably mountable to the mandrel from the near side of the conveyor for sliding thereon and for rotating about the mandrel; a return roller rotatable and supported by the member, wherein the return roller is transverse to the conveyor belt when the member is mounted to the mandrel, wherein rotating the member in a first direction moves the return roller to an operating position for supporting the conveyor belt and rotating the member in a second direction moves the return roller to a position wherein the member and return roller are removable from the support mandrel.

15 Claims, 8 Drawing Sheets

FOREIGN PATENT DOCUMENTS

| | | |
|---|---|---|
| KR | 20-0227825 | 6/2001 |
| KR | 10-0847031 B1 | 7/2008 |

OTHER PUBLICATIONS

ASGCO Mfg., Inc., "One Side Slideler drawing", prior to May 27, 2010, 3 pages.

ASGCO Mfg., Inc., "Load Zone Support Systems", © 2009, 4 pages.

Korean Intellectual Property Office, "International Search Report—Application No. PCT/US2011/038567", Jan. 9, 2012, 3 pages.

Martin Engineering Company, "Trac-Mount® Idlers / Centralizing Idlers", Oct. 1, 1992, 1 page.

Saguaro Conveyor Equipment, Inc., Apr. 2000, 2 pages.

* cited by examiner

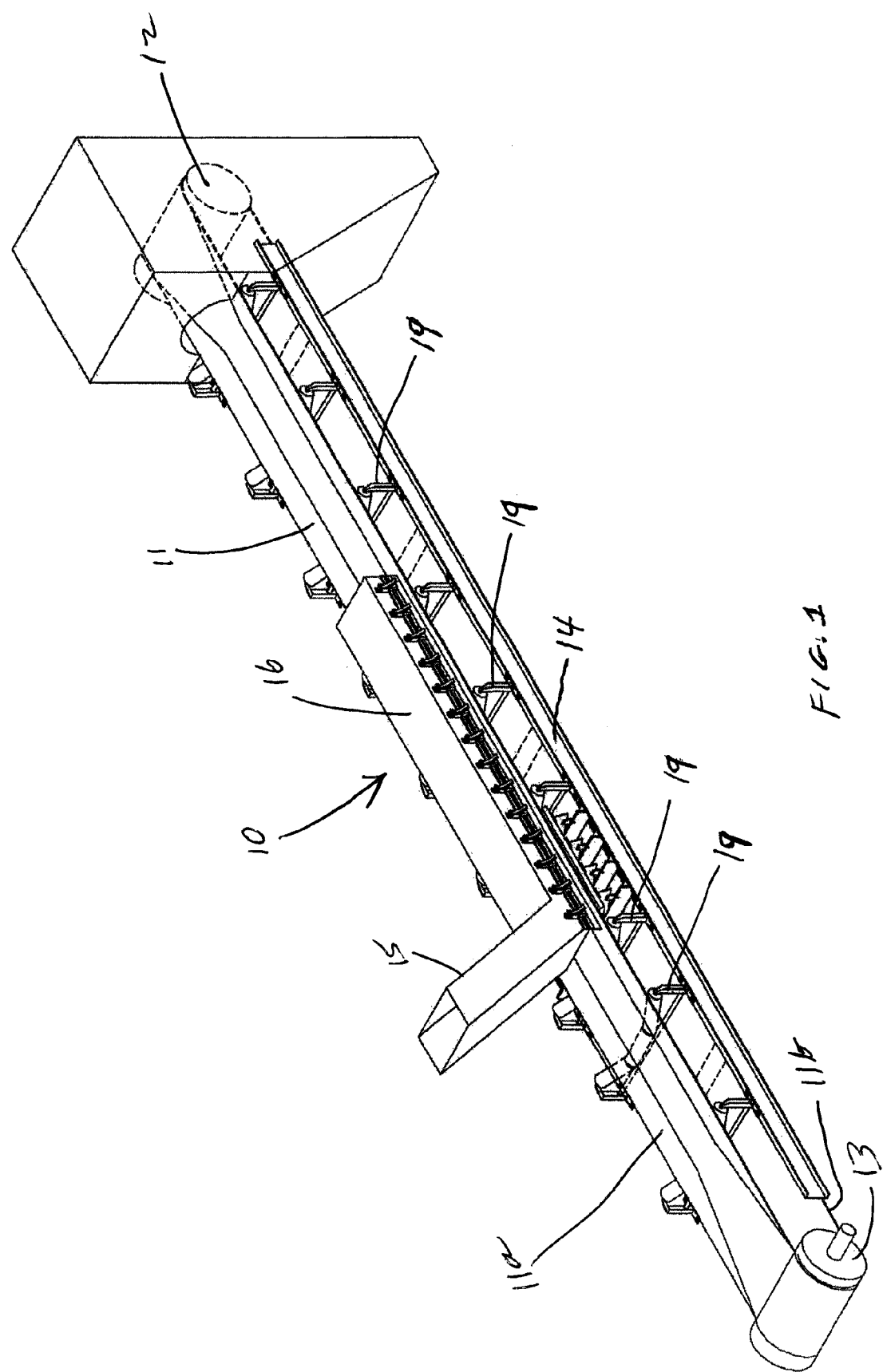

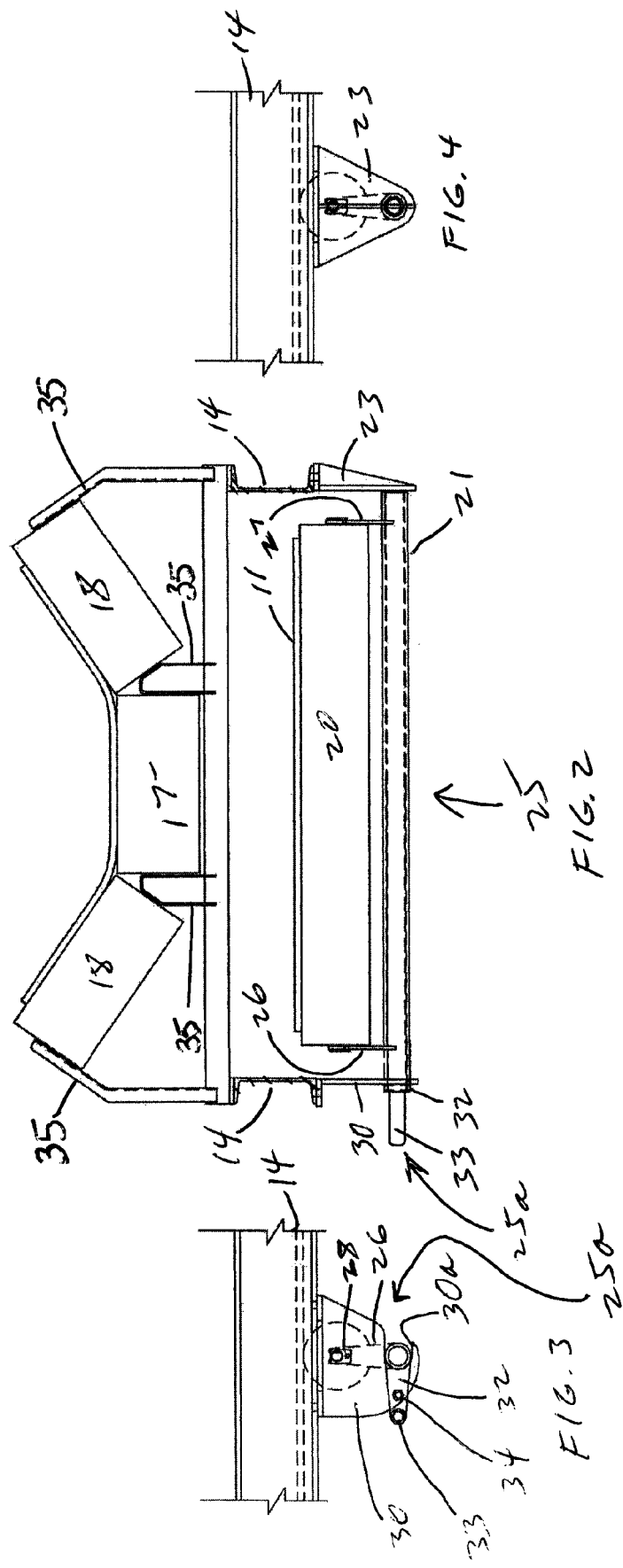

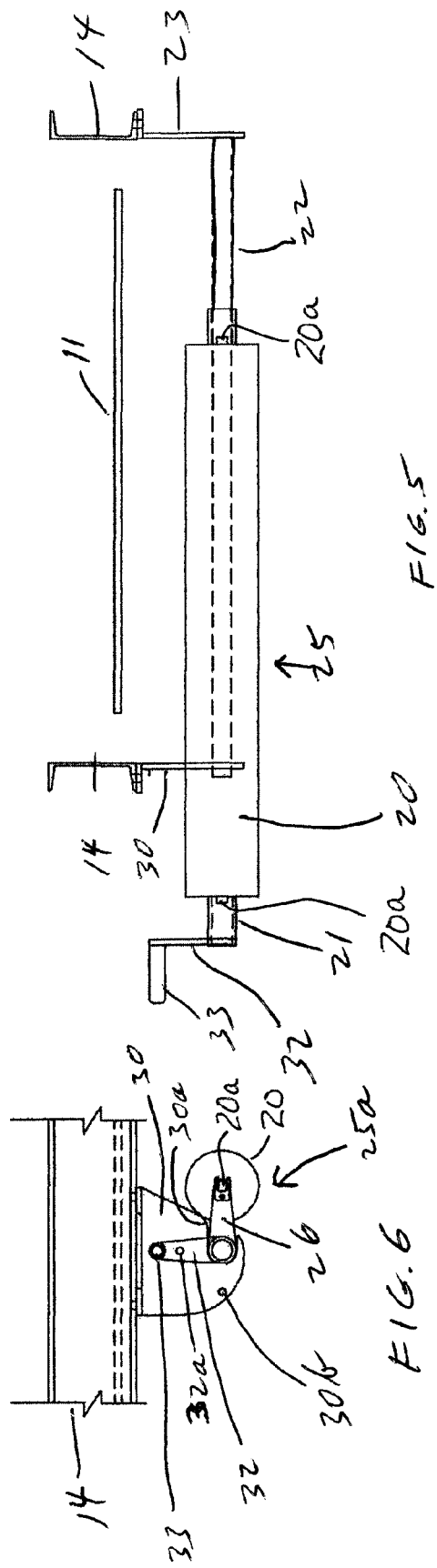

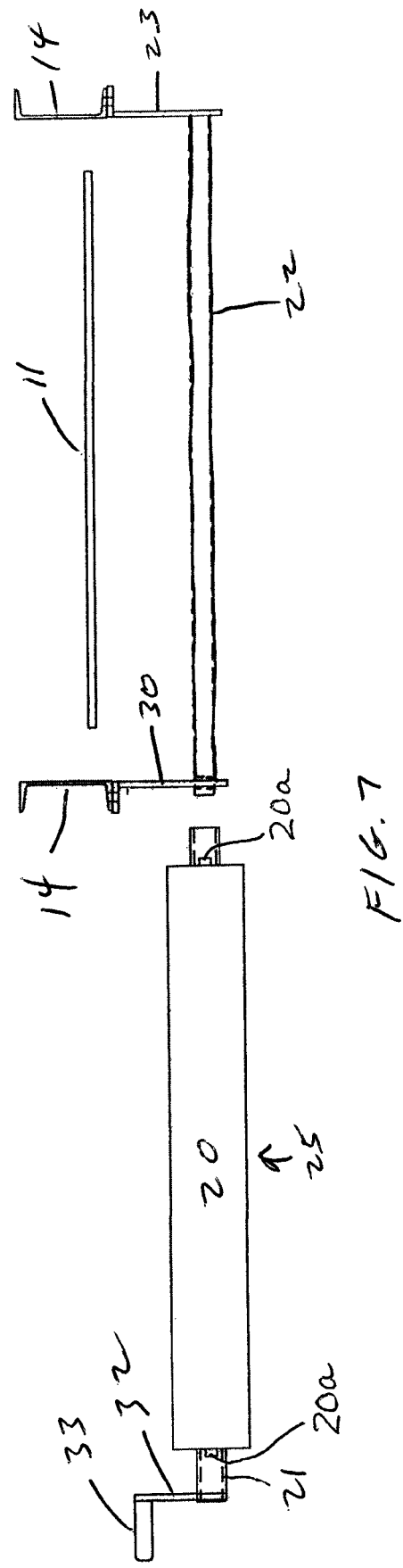

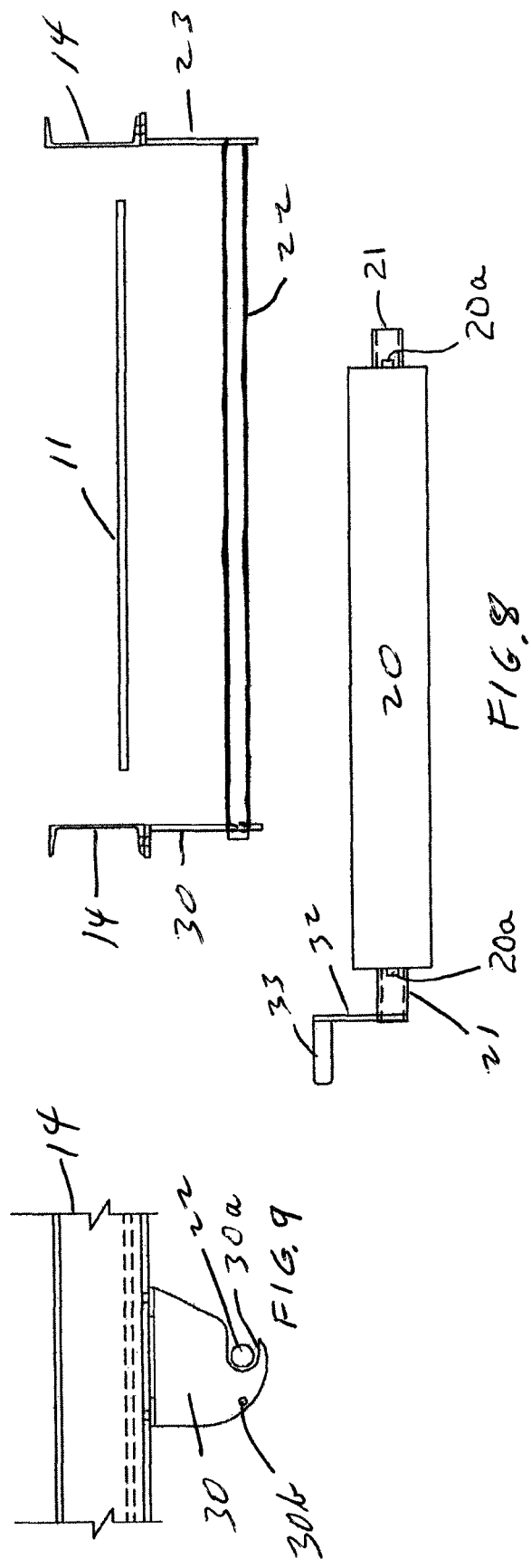

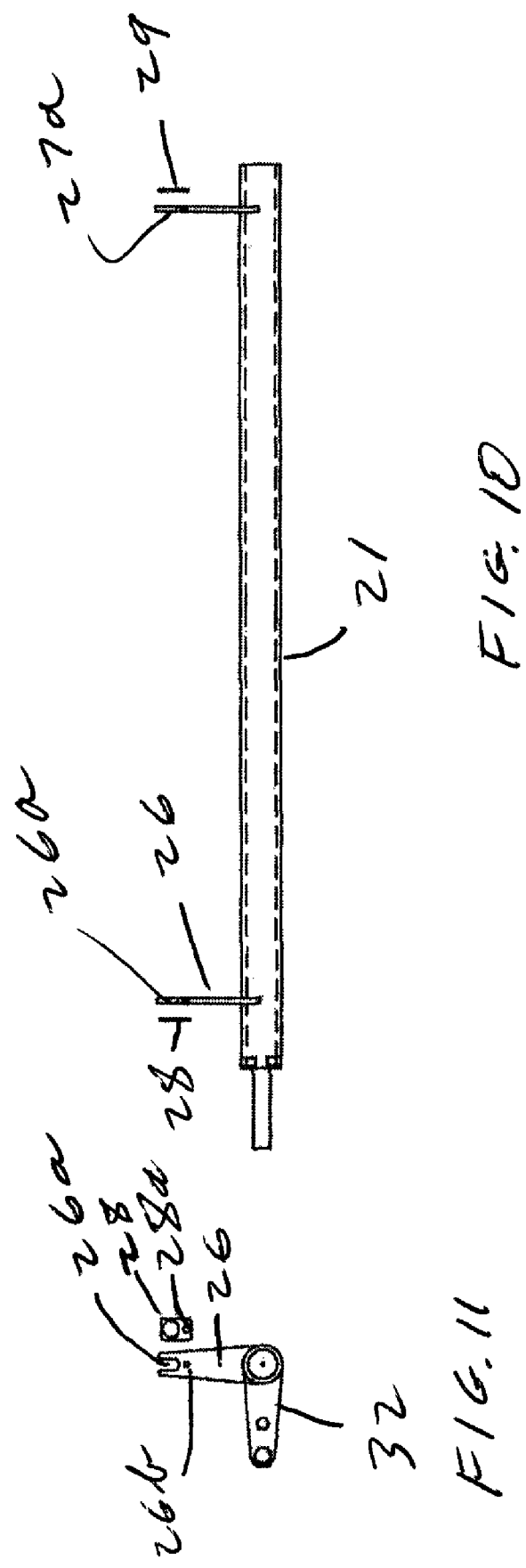

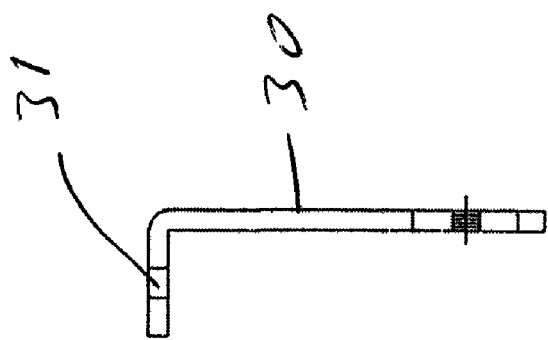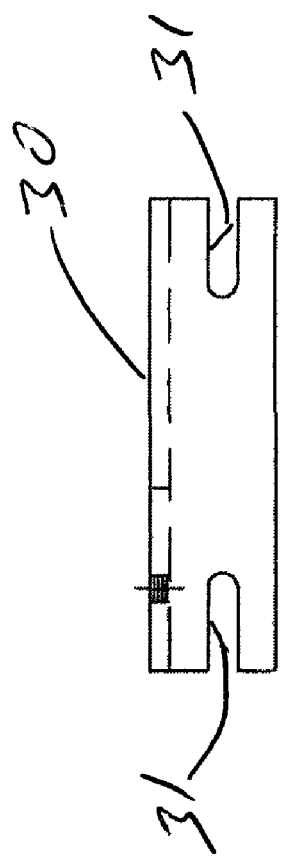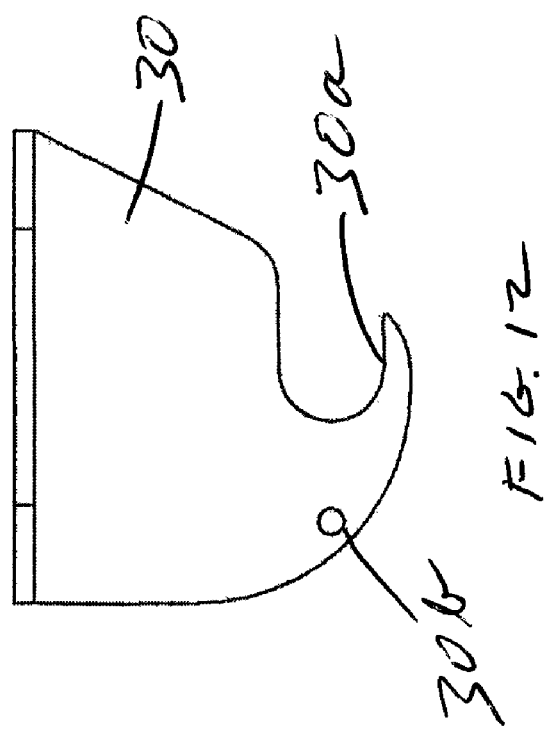

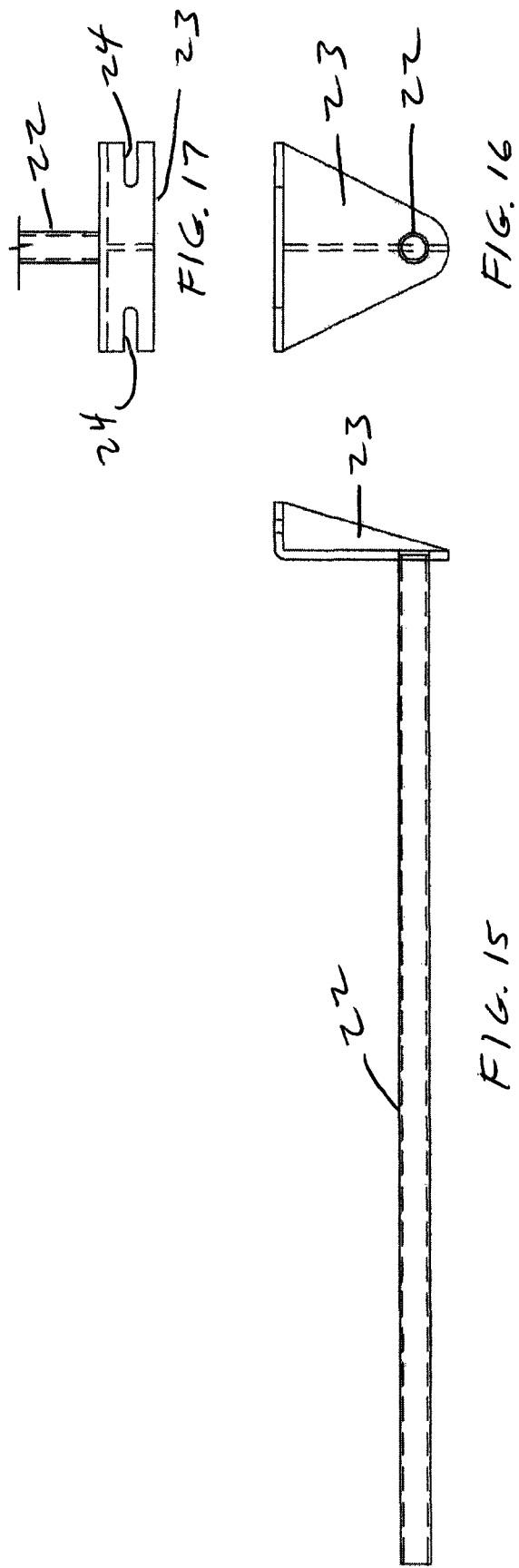

CONVEYOR ROLLER SERVICING APPARATUS

BACKGROUND OF THE PRESENT INVENTION

This invention relates to a conveyor roller servicing apparatus and particularly to an arrangement for servicing the return rollers on an endless conveyor belt handling particulate material and the like.

The movement of industrial material in the form of aggregate and particulate material has for many years been accomplished through trough-type conveyors which operate in relatively severe conditions and require periodic maintenance for changing and lubricating rollers to prevent belt damage. Typically, the return rollers on conveyor belts need to be disconnected from mounting brackets on opposite sides of the conveyor support frame, when it is desired to change or repair the return rollers. The return roller, which contacts the underside of the conveyor belt, operates in a hostile environment where the conveyor belt is used in applications where aggregate and particulate material are conveyed by the belt. The return roller, of course, operates on the dirty side of the belt and the hostile conditions involve dirt, abrasive material, corrosive material, such as salt and moisture, which affect the bearings of the return roller and cause the return roller to stop turning. Hence, changing of the return roller is required to prevent damage to the belt. On many conveyor belt systems, access to the mounting brackets for the return rollers is limited due to the conveyor system being elevated above ground and a catwalk is located on only one side of the conveyor system. Also, space is normally not available on both sides of the conveyor belt system and it would be expensive to duplicate the catwalk and platforms on both sides of the conveyor system for servicing the rollers. Generally, maintenance personnel in order to change or work on the return rollers have used safety lanyards or special safety equipment and have had to work out on the framework of a truss to gain access to the far side of the conveyor belt system where no catwalk is available. Furthermore, since safety procedures and standards have become very strict, it has become more tedious and time consuming to safely gain access to the far side of the conveyor in order to replace or service the return roller on elevated conveyor belt systems.

SUMMARY OF THE PRESENT INVENTION

The present invention provides a mounting apparatus for return rollers on a conveyor system that holds the return roller in proper engagement with the conveyor belt when the conveyor system is operating under normal conditions. When it is desired or necessary to replace or otherwise service the return roller, the present invention provides an arrangement of apparatus to permit disengagement of the return roller from its normal operating position and removal from the conveyor system from one side of the conveyor system, without the need to access the return roller from the far side of the conveyor support structure. The present invention maintains the rigid support for the return roller in the conveyor belt mounting arrangement while permitting easy removal of the return roller from one side of the conveyor system.

According to another aspect, a return side conveyor belt support for a conveyor may comprise: a mandrel mountable to the far side of the conveyor and extending transversely toward the near side thereof; a member slidably and rotatably mountable to the mandrel from the near side of the conveyor for sliding thereon and for rotating about the mandrel; a return roller rotatable and supported by the member, wherein the return roller is transverse to the conveyor belt when the member is mounted to the mandrel, wherein rotating the member in a first direction moves the return roller to an operating position for supporting the conveyor belt and rotating the member in a second direction moves the return roller to a position wherein the member and return roller are removable from the support mandrel.

BRIEF DESCRIPTION OF THE DRAWINGS

The foregoing summary, as well as the following detailed description of the preferred embodiments of the present invention, and the drawings furnished herewith illustrate the present invention.

In the Drawings:

FIG. 1 is the perspective view of a conveyor assembly for conveying material embodying the present invention;

FIG. 2 is an enlarged sectional view of the conveyor assembly of FIG. 1;

FIG. 3 is a fragmentary side elevational view of the left side of FIG. 2;

FIG. 4 is a fragmentary side elevational view of the right side of FIG. 2;

FIG. 5 is a fragmentary, exploded view of a portion of FIG. 2 showing the return roller structure being removed;

FIG. 6 is a fragmentary side elevational view of FIG. 5 showing the return roller being removed;

FIG. 7 is a further view of the return roller and its support assembly similar to FIG. 5 but showing the return roller completely removed from the support shaft;

FIG. 8 is a further view of the return roller and its support assembly similar to FIG. 7 but showing the return roller beneath its support assembly;

FIG. 9 is a side elevational view of FIG. 8 showing the support structure for the return roller in FIG. 8, but with the return roller structure removed;

FIG. 10 is a view of the return roller mounting tubing and brackets for support of the return roller and retainers for the roller shaft;

FIG. 11 is an exploded side elevational view of the return roller mounting tube, bracket and retainer of FIG. 10;

FIG. 12 is a side elevational view of the mounting bracket which supports the free end of the return roller;

FIG. 13 is a top view of the mounting bracket of FIG. 12;

FIG. 14 is a side elevational view of the mounting bracket of FIG. 12;

FIG. 15 is a view of the mandrel for supporting the return roller structure attached to its support bracket;

FIG. 16 is a side elevational view of the support bracket and mandrel of FIG. 15;

FIG. 17 is a top elevational view of the bracket and mandrel of FIG. 15,

DETAILED DESCRIPTION OF THE PREFERRED EMBODIMENT

Referring now to the drawings, FIG. 1 illustrates an endless conveyor belt assembly generally designated 10. The endless conveyor belt assembly for illustration, includes an endless troughing conveyor belt 11 extending around a head pulley 12 and a tail pulley 13 providing a carry side 11a and a return side 11b for the belt, which is supported by a belt support frame 14. There is provided along the belt support frame 14, a plurality of belt supports 19 supporting the conveyor belt 11 between the head pulley 12 and the tail pulley 13. The conveyor belt 11 is designed to transport aggregate or particulate material that is loaded onto the conveyor belt through chute 15 in loading zone 16. The conveyor belt 11 carries the material away from the loading zone 16 and discharges the material at the head pulley 12 area. As shown in the sectional view of FIG. 2, the carry run of the conveyor belt is supported by a series of rollers. More specifically, at each belt support station 19 along the carry run of the conveyor, the conveyor belt is supported by a central roller 17 and a pair of wing rollers, each designated 18, extending upwardly along the edges of the conveyor belt to provide a troughing arrangement for the edges of the conveyor belt 11. The troughing arrangement prevents the aggregate materials from spilling over the edges of the conveyor belt as the material is transported along the conveyor belt.

Generally, the conveyor belt is formed of a heavy duty material, such as a fabric made of nylon, polyester, kevlar, fiber glass or other such material, and may be covered in rubber. As noted the marginal sides of the belt are canted upwardly to form a trough configuration preventing heavy aggregate material, such as stones or the like or particulate material from spilling from the belt. It is also noted that, after the material has settled on the belt from the loading zone, it may not be necessary to maintain the troughing of the belt to the discharge area. The central and wing roller arrangement are mounted for rotation to formed brackets or stanchions 35 attached to the belt support frame 14 at intervals along the underside of the belt 11 to physically support the belt and maintain the desired location of the belt between the belt supports 14. Each belt support is similarly constructed as indicated in FIG. 1. As shown in FIGS. 2, 3 and 4, a return roller 20 is supported by the belt support structure frame 14 beneath the central roller and wing rollers 17 and 18, respectively. The rollers may be formed of steel or, alternatively, may be formed of an impact absorbing material, such as, rubber, plastic, urethane or a combination of steel and an energy absorbing material. An energy absorbing material is desired in high impact loading applications. Of course, since the belt supports are spaced apart from one another, the belt can deflect to absorb impact forces, thereby reducing damage to the belt.

As previously mentioned, the return roller 20 contacting the return side 11b of the belt 11 in the prior art is generally held or attached to the belt support 14 by brackets at each end of the roller fixed to opposite sides of the belt support structure to support the return roller. Since the return roller supports the belt on the return side of the belt, which has conveyed the aggregate material, it operates in a hostile environment, requiring periodic replacement or servicing of the roller, as the bearings can fail so the roller does not turn and, accordingly, wears the belt. The present invention facilitates an arrangement for easily replacing or servicing the return roller from one side of the conveyor belt system.

Referring to FIGS. 2, 3, and 4, the details of the support structure for the return rollers is shown. When the need arises to replace or otherwise service, the return roller structure of the present invention allows the roller to be disengaged by releasable support apparatus from its normal operation position and removed from the conveyor system from one side of the conveyor system. The structure for holding the return roller 20 in position includes a tubular member or hollow shaft 21, which is received and supported on a mandrel or shaft 22, as shown more specifically in FIGS. 2, 5 and 7. The mandrel 22 is fixed to a bracket 23, as by welding, and the bracket 23 is fixed to the belt support frame 14, preferably by being bolted to the belt support structure 14. The bracket and mandrel arrangement is shown more clearly in FIGS. 14-16. Slots are provided in the upper portion of the bracket 23 for receiving bolts threaded into the belt support frame. In this manner, the mandrel is held fixed and stationary relative to the belt support frame 14.

As shown most clearly in FIGS. 2, 3, 5 and 7, the return roller structure 25 includes the tubular member 21, which slides over and onto the mandrel shaft 22 until it is adjacent the mounting bracket 23 at the far side of the conveyor belt structure. The return roller structure further includes brackets 26 and 27, which are fixed to and extend outwardly from the tubular member 21 to opposite ends of a central shaft through the return roller 20. As shown in FIGS. 10 and 11, the brackets 26 and 27 are provided with notches 26a and 27a to receive the opposite ends of the shaft through the return roller. The return roller shaft 20a is held in the notches 28a. 29a by shaft retainers 28 and 29, respectively, which are fixed to the brackets 26 and 27, as by screws, through the openings, such as opening 28a in retainer 28 mating with an opening 26b in the bracket 26. The openings 28a and 26b are adapted to receive a screw to hold the parts 26, 28 and 27, 29 together and the shaft 20a of the return roller 20 in place. The retainer 29 is arranged similarly to the retainer 28, and is held to bracket 27 for capturing and holding the opposite end of the shaft 20a of the return roller 20.

The accessible or free end of the return roller structure 25 is supported by releasable support apparatus generally designated 25a at the free end of the mandrel 22. More specifically, the return roller structure 25 is supported at its free end in a notch or recess 30a of bracket 30, as shown in FIGS. 3, 6 and 9. Bracket 30 is shown most clearly in FIGS. 11, 12 and 13 and is provided at its top section with slots 31 for receiving screws to fix bracket 30 to the belt support frame 14, as shown in FIG. 2. As shown in FIGS. 2, 3, 5 and 6, a rotatable member shown as a lever or crank 32, is fixed to the free or accessible end of the tubular member 21 of the return roller structure 25. The lever 32 is provided with a handle 33 for rotating the lever and the return roller structure about the mandrel 22.

In this arrangement, as indicated in FIGS. 5 and 6, the tubular member 21 of the return roller structure 25 is slid onto the mandrel 22 with the return roller 20 being free to pass by bracket 30 and be slid down the mandrel 22. When the tubular member 21 is adjacent bracket 23, the return roller structure 25 is then rotated into operative position, as shown in FIG. 2, to support the under side of the conveyor belt. When the return roller structure is rotated into its operative position to support the conveyor belt by the handle on the lever, the lever 32 is locked into position as by a locking mechanism. In the arrangement shown, the locking mechanism includes a cap screw passing through opening 32a in the lever mating with opening 30b in the bracket 30, as shown in FIG. 2. More specifically, the cap screw would be threaded into the openings 32a and 30b for locking the return roller structure fixed to support bracket 30 for maintaining the return roller structure in operative position for supporting the conveyor belt 11.

When it is desired to remove or service the return roller 20, the cap screw 34 in FIG. 3 would be removed permitting the lever 32 to be rotated moving the return roller structure from its operative position to be rotated about mandrel 22 to the position shown in FIG. 5. The return roller structure is then slid off the mandrel 22 as shown in FIG. 5 with the return roller bypassing support bracket 30 for complete removal from the mandrel, as shown in FIGS. 7 and 8. In this manner, the return roller is permitted to be easily removed from the mandrel 22 and replaced on the mandrel 22 be returned to its operative position.

The present invention thus provides an effective, efficient and safe manner to service the return roller from one side of the conveyor belt structure, avoiding the necessity for access to the return roller support structure from the opposite side of the conveyor belt. It will be recognized by those skilled in the art that changes and modifications can be made to the above described embodiment without departing from the broad inventive concept of the invention. For example various parts can be fixed together by a wide variety of means known to those skilled in the art. It should be understood that this invention is not limited to the particular embodiment described herein but is intended to include all changes and modifications that are within the scope and spirit of the invention as set forth in the following claims.

What is claimed is:

1. A conveyor assembly comprising:
   (1) a continuous conveyor belt extending about a head pulley and a tail pulley to have a carry side and a return side for the belt, wherein the conveyor assembly has a loading zone where material is loaded onto the carry side of the belt and a transport zone between the loading zone and the head pulley;
   (2) a plurality of belt supports positioned along the length of the belt for supporting carry and return sides of the conveyor belt, each belt support comprising:
      (a) a return roller structure extending across the width of the belt and supported by the belt support on one side of the conveyor assembly;
      (b) a return roller on the return roller structure, and wherein each belt support includes a shaft support by the belt support on the one side of the conveyor assembly and extending to the opposite side of the conveyor assembly, the shaft being adapted to slidably receive the return roller structure from the opposite side of the conveyor assembly, said return roller support including a tubular member to be received on the shaft;
      (c) a releasable support apparatus adapted to support the other side of the return roller structure on the opposite side of the conveyor assembly, whereby upon release of the releasable support apparatus, the return roller structure can be removed from the opposite side of the conveyor assembly, said releasable support apparatus including a holding bracket having a recess adapted to have the return roller structure pass through the recess onto the shaft for support the end of the return roller structure, when the return roller is moved into operative position to support the return side of the belt, and wherein the releasable support apparatus further includes a rotatable member for rotating the return roller structure to have the return roller in operative position and locking mechanism for releasing holding the rotatable member to the holding bracket, whereby when the locking mechanism is released and the lever is rotated, the return roller structure can be removed from the opposite side of the conveyor assembly.

2. For a conveyor comprising a continuous conveyor belt extending about a head pulley and a tail pulley to have a carry side and a return side, the conveyor having a near side near one edge of the conveyor belt and a far side near an opposite edge of the conveyor belt,
   a return side conveyor belt support comprising:
      a support mandrel mountable to the far side of the conveyor and extending transversely toward the near side thereof;
      a member slidably and rotatably mountable to said support mandrel from the near side of the conveyor for sliding thereon in a direction transverse to the conveyor belt and for rotating about said support mandrel;
      a return roller rotatable on a return roller shaft and supported by said member, wherein said return roller is transverse to the conveyor belt when the member is mounted to said support mandrel;
      wherein rotating said member in a first direction relative to said support mandrel moves said return roller to an operating position for supporting the conveyor belt and rotating said member in a second direction relative to said support mandrel moves said return roller away from the operating position to a position wherein said member with said return roller thereon is slidably removable from said support mandrel.

3. The return side conveyor belt support of claim 2 wherein said member is a hollow member that slides onto said support mandrel for providing the slidable and rotatable mounting.

4. The return side conveyor belt support of claim 2 wherein said member includes brackets extending therefrom for supporting said return roller shaft.

5. The return side conveyor belt support of claim 4 wherein said return roller shaft is retained to said brackets by locking retainers.

6. The return side conveyor belt support of claim 2 wherein said member includes a crank for rotating said member.

7. The return side conveyor belt support of claim 6 wherein said crank includes a lever and a handle.

8. The return side conveyor belt support of claim 2 further comprising a bracket attached to a conveyor frame at the far side of the conveyor for supporting said support mandrel transversely to the conveyor belt.

9. The return side conveyor belt support of claim 2 further comprising a bracket attached to a conveyor frame at the near side of the conveyor and having a notch for receiving said member therein.

10. A return side conveyor belt support for a conveyor comprising a continuous conveyor belt extending about a head pulley and a tail pulley to have a carry side and a return side, the conveyor having a near side near one edge of the conveyor belt and a far side near an opposite edge of the conveyor belt, said return side conveyor belt support comprising:
    a support mandrel mountable to the far side of the conveyor and extending transversely toward the near side thereof, wherein said support mandrel is attached to a conveyor frame at the far side of the conveyor for supporting said support mandrel transversely to the conveyor belt;
    a hollow member slidably and rotatably mountable to said support mandrel from the near side of the conveyor for sliding thereon in a direction transverse to the conveyor belt and for rotating about said support mandrel;
    a crank attached to said hollow member for rotating said hollow member about said support mandrel;
    a return roller rotatable on a return roller shaft and supported by said hollow member, wherein said return roller is transverse to the conveyor belt when the hollow member is mounted to said support mandrel;
    wherein moving said crank to rotate said hollow member in a first direction relative to said support mandrel moves said return roller to an operating position for supporting the conveyor belt and rotating said crank to rotate said hollow member in a second direction relative to said support mandrel moves said return roller away from the operating position to a position wherein said hollow member with said return roller thereon is slidably removable from said support mandrel.

11. The return side conveyor belt support of claim 10 wherein said hollow member is a tubular member that slides onto said support mandrel for providing the slidable and rotatable mounting.

12. The return side conveyor belt support of claim 10 wherein said hollow member includes brackets extending therefrom for supporting said return roller shaft.

13. The return side conveyor belt support of claim 12 wherein said return roller shaft is retained to said brackets by locking retainers.

14. The return side conveyor belt support of claim 10 wherein said crank includes a lever and a handle.

15. The return side conveyor belt support of claim 10 further comprising a bracket attached to the conveyor frame at the near side of the conveyor and having a notch for receiving said hollow member therein.

* * * * *